Feb. 16, 1926.

P. HANFORD 1,573,058

SHOCK ABSORBER

Filed July 14, 1919    2 Sheets-Sheet 1

Inventor
Parmly Hanford
By Sturtevant & Mason
Attorneys

Feb. 16, 1926.
P. HANFORD
SHOCK ABSORBER
Filed July 14, 1919
1,573,058
2 Sheets-Sheet 2
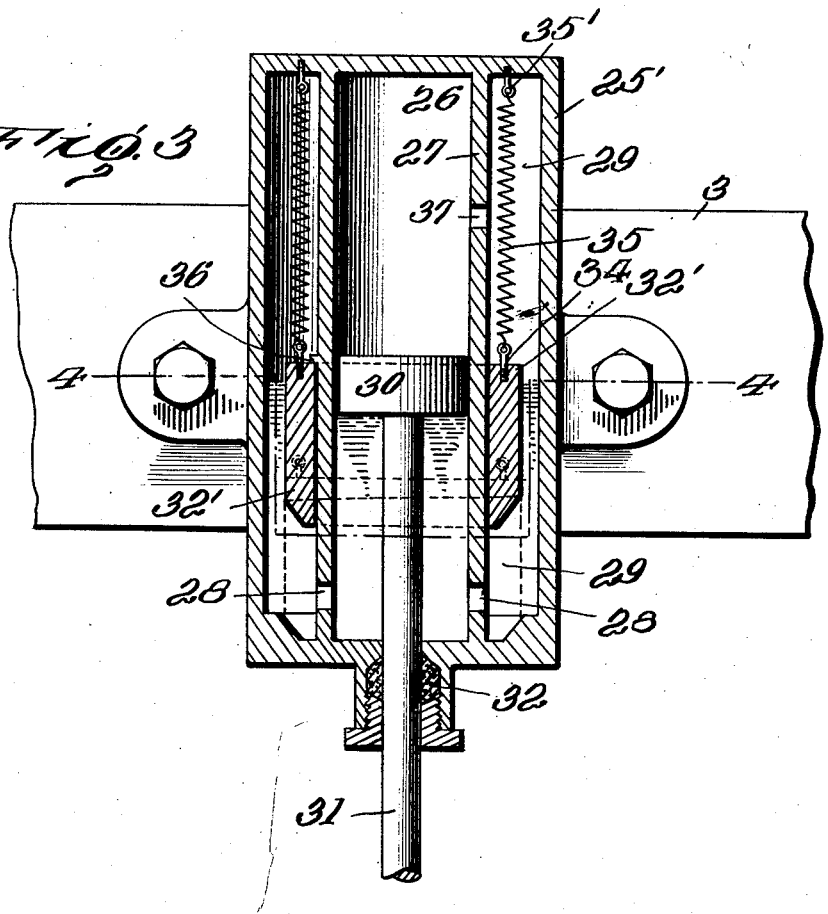
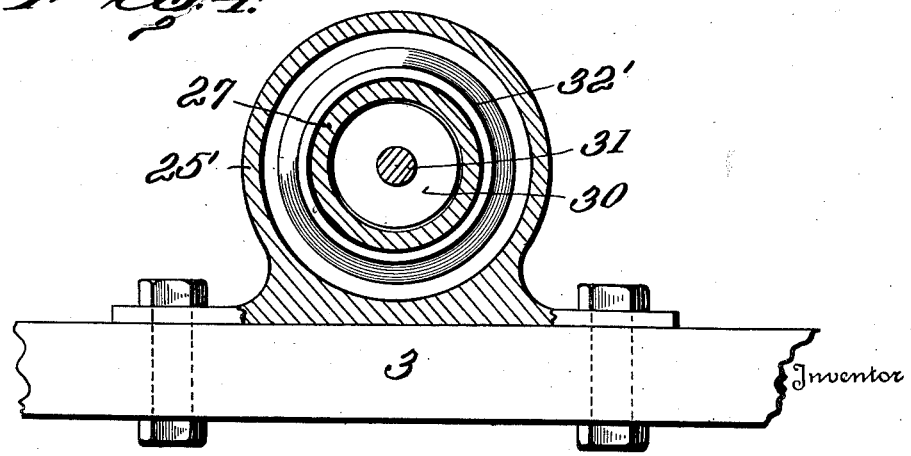

Patented Feb. 16, 1926.

1,573,058

UNITED STATES PATENT OFFICE.

PARMLY HANFORD, OF SPRINGFIELD, MASSACHUSETTS.

SHOCK ABSORBER.

Application filed July 14, 1919. Serial No. 310,716.

*To all whom it may concern:*

Be it known that I, PARMLY HANFORD, a citizen of the United States, residing at Springfield, in the county of Hampden, State of Massachusetts, have invented certain new and useful Improvements in Shock Absorbers, of which the following is a description, reference being had to the accompanying drawing and to the figures of reference marked thereon.

This invention relates to shock absorbers for motor vehicles.

The object of the invention is to provide a shock absorber which normally allows the springs free action regardless of whether they are expanding or contracting, and which only comes into action when the chassis rises suddenly from its plane of travel, at which time it functions to prevent the springs from expanding too quickly.

Referring more particularly to the drawings—

Figure 3 is still another embodiment; and

Figure 4 is a sectional view thereof, taken through the line 4—4.

One form of the invention consists of a friction drum rotatably mounted on the chassis of the vehicle and provided with a connection to the axle, whereby, as the axle approaches the chassis, the drum is rotated. Either externally or internally mounted on or in said drum is a friction strap having one end thereof fast to the chassis and the other end adapted to be operated by one end of a lever, likewise pivoted to the chassis, so that movement of said lever in the proper direction operates to tighten the strap on the drum. Mounted preferably adjustably of the strap on the free end of the lever, is a weight which normally moves with the lever and the chassis, but which, due to its inertia and its suspended position on said lever, operates said lever upon the occurrence of any sudden upward movement of the chassis.

In another form the invention includes a cylinder attached to the chassis and a piston reciprocable therein, the free end of which is connected with the axle. Between the piston and the bottom of the cylinder there is provided a braking fluid with ports in the bottom walls of said cylinder to provide for the escape of said fluid whereby said piston may approach the bottom of said cylinder. Located normally above said ports and suspended in such position from the cylinder casing by a spring, is a weight which normally reciprocates with the cylinder when the chassis moves, but which, due to its inertia and the suspension thereof from the cylinder, permits a relative movement between it and the cylinder, thereby operating to close the ports in the cylinder to check the movement of the piston therein, so that the chassis can not spring upwardly suddenly.

Figure 2:
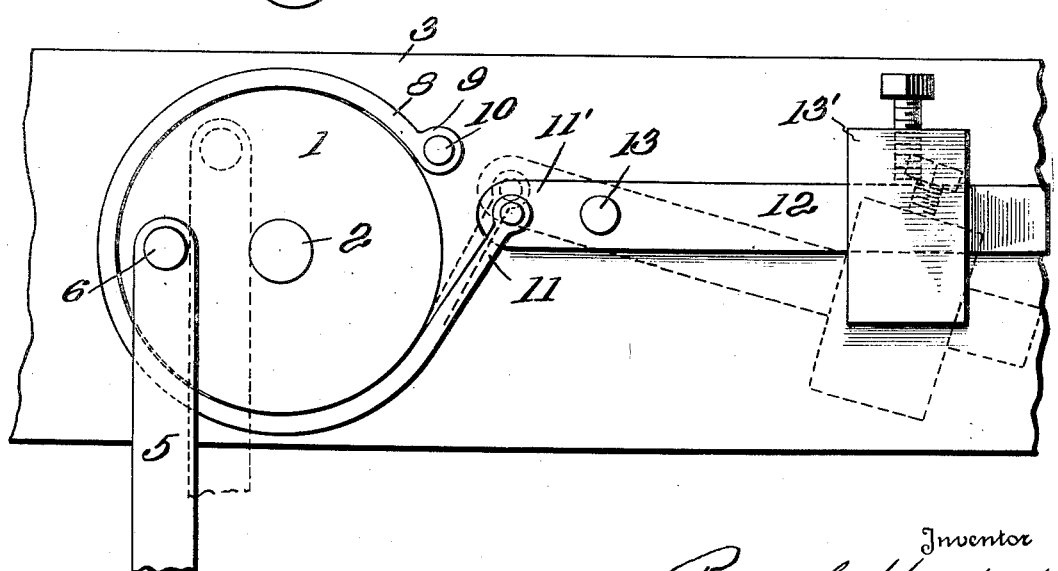
Figure 2 is a modification thereof.

Referring now more particularly to Figure 2, there is provided a movable member in the form of a cylindrical drum 1, rotatively mounted on the shaft 2, fixed to the chassis 3 of the vehicle. In order to connect this drum 1 with the axle 4, there is provided a rod 5 pivoted to the drum, as at 6, and connected to the axle in any suitable manner. A braking or retarding member for the drum 1 is provided in the shape of a friction strap 8, one end 9 of which is pivoted to the chassis, as at 10, and the other end 11 to the end 11' of a lever 12 pivoted at 13 to the chassis. On the other end of the lever 12 is slidably mounted the weight 13'.

In operation, when the vehicle wheels encounter small inequalities in the road, the up and down movement of the chassis is not sudden enough to cause relative movement of the weighted arm or lever 12, so the weight 13' will move with the chassis 3, but when a sudden jolt occurs the springs in expanding rapidly will cause a quick upward movement of the chassis 3, on which is mounted the lever 12, and by reason of the suspended position of the weight 13' and the inertia thereof, it will act to depress the lever 12 and force the free end 11' to tighten the strap 8 on the drum 1, thus checking the rotation of the drum and likewise the movement of the chassis away from the axle.

Figure 1:
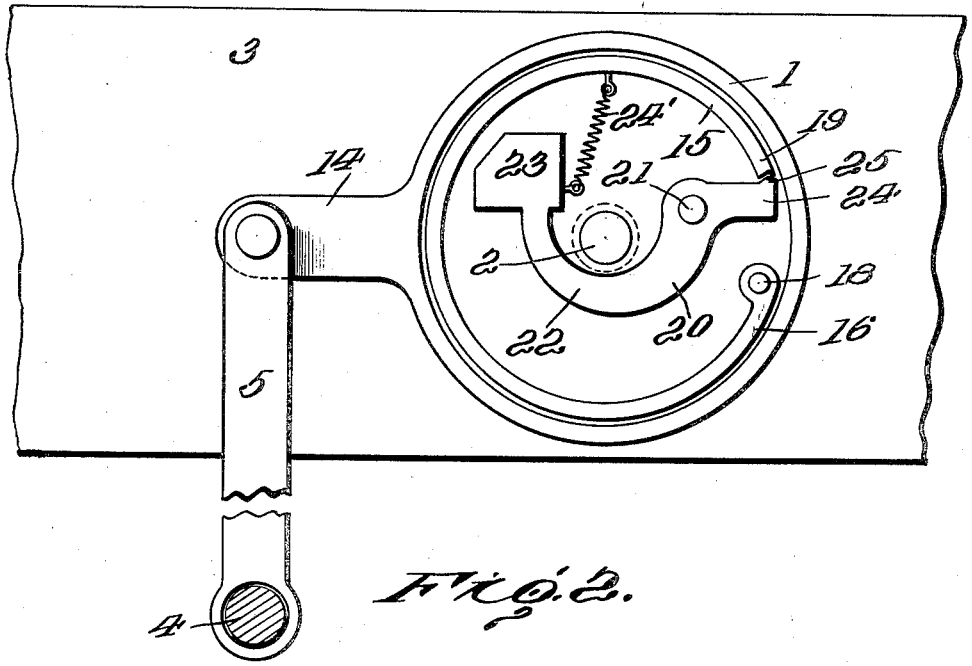
Figure 1 is an elevation of one form of my device, the connection to the chassis being omitted.

In the form disclosed in Figure 1 the outer portion of the drum has been removed, leaving only the drum rim 1 and the journal represented by the dotted circle around the shaft 2. In this view the rim 1 is provided with a laterally extending arm 14, pivotally connected to the rod 5, adapted to be attached to the axle 4. Located within the drum is a friction strap 15 having one end 16 attached to the chassis as at 18, and the other end 19 within the path of movement of the weighted lever 20, which is likewise mounted within the drum 1 and pivoted to the chassis, as at 21. One end 22 of the lever 20 is curved about the shaft 2 (likewise mounted on the chassis) and provided with a weight 23 on its extreme end, while the other end 24 thereof is provided with a nose 25 to engage the free end 19 of the expanding strap 15. In order to support the weight 23 in its normal position and to prevent the strap from rubbing against the drum 1, there is provided the suspension spring 24' having one end attached to the strap 15 and the other end to the weight. The curvilinear shape of the lever arm is merely for the purpose of providing a compact arrangement.

Referring to the modification shown in Figures 3 and 4, the chassis 3 is provided with a vertically located cylinder 25', having an inner cylindrical piston chamber 26, between the walls 27 of which and the walls of the cylinder 25' is located an annular chamber 29. Near the bottom, the walls 27 of the inner piston chamber 26 are provided with one or more ports 28 connecting said piston chamber with the annular surrounding chamber 29. Located within the piston chamber 26 is a piston 30 provided with a rod 31 passing through a suitable packing 32 at one end of the cylinder and adapted to be connected to the axle. In order to provide a braking effect between the cylinder 25' and piston 30, there is introduced into the piston chamber a fluid medium in the form of oil or any other suitable liquid, and, normally, this oil is capable of passing freely through the ports 28 in the walls 27 of the piston chamber 26 into the annular surrounding chamber 29. For the purpose of controlling these ports 28, there is located, preferably in this outer chamber 29, an annular weight 32' of suitable shape and configuration to act as a closing valve for the ports. This weight is adapted to be held in suspended position above the ports by means of a spring 35 attached at the lower end of the weight, as at 34, and at its upper end to the top of the cylinder casing, as at 35'. To limit the extreme upper movement of the weight in said chamber there is preferably provided a lug 36 on the interior wall of said chamber 29. Near the top of the wall 27 of the piston chamber 26 is located a port 37 through which any oil escaping past the piston may return to the outer chamber 29. This port also serves to equalize the pressure in the inner and outer chambers.

In operation a sudden upward movement of the chassis 3 will cause the weight 32' to take the position shown in dotted lines, thereby closing the ports 28 and preventing the sudden escape of the fluid, so that the relative movement between the piston 30 and the cylinder 25' is checked. As in this prior construction, this relative movement between the weight and the cylinder (attached to the chassis 3) is due to the inertia of the weight and its suspended position on the chassis.

While this action is produced by a sudden upward movement of the chassis, on the other hand, any gradual or slight movement of the chassis in either direction will carry the weight with it, so that the ports will remain open, allowing the free relative movement between the chassis and the axle.

Having thus described my invention, what I claim as new and desire to secure by Letters Patent, is:

1. A shock absorber for motor vehicles including a friction drum connected to the chassis and axle whereby said drum is operated by the relative movement between said drum and axle, a friction strap operatively arranged with respect to the drum, a vertically movable weight, and connections from said weight to said strap to operate the latter upon the occasion of a sudden movement of said chassis.

2. A shock absorber for motor vehicles comprising a friction drum mounted on the chassis, an arm pivoted to said drum and connected to the axle, a friction band engaging said drum, one end of said band being fixed to the chassis, a weighted lever pivoted to said chassis and capable of movement about its pivot due to the inertia of the weight thereof upon a sudden movement of said chassis for operating said friction band.

3. In a device of the character set forth, an oscillating drum actuated by approach or separation of axle and chassis, a braking device to retard the oscillation of said drum and an inertia means to cause said braking device to act with varying pressures on said drum.

4. In a device of the character set forth, an oscillating drum actuated by approach and separation of axle and chassis, a restraining device and means to cause said restraining device to act upon said drum with differential forces depending upon the relations existing between the vertical acceleration of the chassis and movements of approach or recession between the chassis and axle.

5. In a device of the character set forth, a movable drum, means to communicate vertical movement of an axle to said drum to oscillate it, a brake band about the drum, and inertia means to contract the brake band, said inertia means operating upon said brake band with varying pressures.

6. In a shock absorber for vehicles, a balanced actuating member, and means to restrain relative movement of chassis and axle of the vehicle operated upon displacement of said actuating member from its normal balanced position, said restraining means comprising a brake band and an oscillatory drum with which said brake band contacts.

7. In a shock absorber for vehicles, a balanced weight and means to restrain relative movement of chassis and axle of the vehicle operated upon displacement of said weight from its normal balanced position, said restraining means comprising a brake band, and a brake drum, and means to cause said brake band to wrap up on the drum.

8. In a shock absorber for vehicles, a balanced weight and means to restrain relative movement of the chassis and axle of the vehicle operated upon displacement of said weight from its normal balanced position, said restraining means comprising a brake band and a brake drum, said drum being mounted to oscillate upon relative movement of chassis and axle, and a lever connected to said weight, said lever bearing against the brake band.

9. In a shock absorber for vehicles, a balanced weight and means to restrain relative movement of the chassis and axle of the vehicle operated upon displacement of said weight from its normal balanced position, said restraining means comprising a brake band and a brake drum, said drum being mounted to oscillate upon relative movement of chassis and axle, a lever connected to said weight, said lever bearing against the brake band, and an abutment in the path of the brake band to prevent its rotation with the brake drum.

10. In a shock absorber for vehicles, a brake drum oscillated upon relative movement of the chassis and axle, a split brake band surrounding said drum and means to cause said brake band to restrain the oscillations of said drum, said means comprising an inertia weight and a lever to contract said band, and means to cause said band to wrap itself upon said drum.

11. In a shock absorber for vehicles, a brake drum oscillated upon relative movement of the chassis and axle, a split brake band surrounding said drum, and means to cause said brake band to restrain the oscillations of said drum, said means comprising an inertia weight and a lever connected therewith to contract the band, and an abutment in the path of the band to prevent its movement with the drum.

12. In a shock absorber adapted to control the motion of a spring mounted body, a balanced actuating member, and means to restrain movement of the body relative to its support operated upon displacement of the actuating member from its normal balanced position, said restraining means comprising a brake band and an oscillatory drum with which said brake band contacts.

13. In a shock absorber adapted to control the motion of a spring mounted body, a balanced actuating member, and means to restrain movement of the body relative to its support operated upon displacement of the actuating member from its normal balanced position, said restraining means comprising a brake band and an oscillatory drum enclosed by the brake band, and connections from the body and the actuating member to the band and the drum to oscillate the drum and contract the band.

In testimony whereof, I affix my signature.

PARMLY HANFORD.